United States Patent
Schneider

(10) Patent No.: US 7,109,689 B2
(45) Date of Patent: Sep. 19, 2006

(54) TRANSIENT-PHASE PWM POWER SUPPLY AND METHOD

(75) Inventor: Michael Edwin Schneider, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 213 days.

(21) Appl. No.: 10/688,498

(22) Filed: Oct. 17, 2003

(65) Prior Publication Data

US 2004/0196019 A1    Oct. 7, 2004

Related U.S. Application Data

(60) Provisional application No. 60/460,460, filed on Apr. 4, 2003.

(51) Int. Cl.
*G05F 1/59* (2006.01)

(52) U.S. Cl. ........................... 323/272; 323/284
(58) Field of Classification Search ............... 323/272, 323/282, 284
See application file for complete search history.

(56) References Cited

U.S. PATENT DOCUMENTS

| | | | |
|---|---|---|---|
| 6,023,154 A * | 2/2000 | Martinez | |
| 6,150,803 A * | 11/2000 | Varga | |
| 6,198,261 B1 * | 3/2001 | Schultz et al. | |
| 6,232,754 B1 * | 5/2001 | Liebler et al. | |
| 6,281,666 B1 * | 8/2001 | Tressler et al. | |
| 6,346,798 B1 * | 2/2002 | Passoni et al. | |
| 6,362,607 B1 * | 3/2002 | Wickersham et al. | |
| 6,362,608 B1 * | 3/2002 | Ashburn et al. | |
| 6,424,129 B1 * | 7/2002 | Lethellier | |
| 6,462,521 B1 * | 10/2002 | Yang et al. | |
| 6,605,931 B1 * | 8/2003 | Brooks | |
| 6,696,823 B1 * | 2/2004 | Ledenev | |
| 6,801,026 B1 * | 10/2004 | Schrom et al. | |
| 6,803,752 B1 * | 10/2004 | Chen | 323/282 |

* cited by examiner

*Primary Examiner*—Jeffrey Sterrett
(74) *Attorney, Agent, or Firm*—Graybeal Jackson Haley LLP

(57) ABSTRACT

A regulator supplies a regulated voltage to an electronic component with a plurality of phases with varying response rates. The regulator includes an output node that provides a regulated supply voltage, a first main-phase drive circuit that provides a first main load current to the output node and that has an on time and an off time, and a first transient-phase drive circuit that has a first transient load current to the output node that has an on time and an off time that are respectively less than the on and off times of the first main-phase drive circuit.

23 Claims, 3 Drawing Sheets

TRANSIENT-PHASE PWM POWER SUPPLY AND METHOD

CLAIM OF PRIORITY

This application claims priority to U.S. Provisional Application Ser. No. 60/460,460, filed on Apr. 4, 2003, which is incorporated by reference.

BACKGROUND OF THE INVENTION

Today's electronic systems typically require a relatively high amount of current from one or more highly regulated power supplies. A typical computer system will draw 50–60 Amperes (A) (laptop) or 80–120 As (desktop/server) from a 1.2 to 1.3 volt (v) power supply. In the past, linear power supplies have been used, but a significant amount of power is typically dissipated across the pass element. As a result, pulse-width modulated (PWM) switching power supplies were introduced to provide power in a more efficient manner. Switching power supplies dissipate less power than linear power supplies because the drive transistors operate in either full-on or full-off mode. Specifically, in the full-on mode, the voltage drop across a drive transistor is minimal, and in the full-off mode, no current flows through the drive transistor. Therefore, in the full-on mode, there is low power dissipation in the drive transistor even at a relatively high current.

To provide relatively high output currents, conventional PWM power supplies include one or more main channels or phases. Each phase is driven by a PWM controller chip and includes a driver, a pair of output drive transistors arranged in a push/pull configuration, and a filter inductor, which is coupled to a filter capacitor which is common to all phases. Because the drive transistors provide relatively high current, they are relatively high-power devices that, in turn, have relatively slow on/off times. Therefore, it is desirable to drive a main phase with a relatively long pulse width so that the high-power drive transistors have sufficient time to turn on and operate in the full-on mode. That is, for the best efficiency, the pulse width should be much greater—for example, at least ten times greater—than the longer of the drive transistors' on and off times.

Of course, without proper filtering, longer on times at relatively high currents will typically cause the drive transistors to rather quickly, overcharge the filter capacitor and, thus, drive the output voltage above the regulated range. One way to prevent this over-voltage situation would be to drive the transistors using relatively short pulse widths. But as stated above, because these transistors have relatively slow on/off times, such operation would be very inefficient.

Consequently, a filter inductor is typically placed between the drive transistors and the filter capacitor. From the standard inductance equation V=LdI/dT, one can see that dI/dT=V/L, where V is the voltage across an inductor, L is the inductance, and I is the current through the inductor. Therefore, one selects the size of the inductor such that dI/dT is small enough to allow the relatively long pulse widths to drive the transistors without overshooting the regulated voltage. Although this allows the drive transistors to operate efficiently and to provide large amounts of power, the response time of each main phase to transients (caused by sudden demands for either an increase or a decrease in power from the power supply) is relatively slow. Therefore, such transients can cause the power supply voltage to temporarily go out of the regulated range, i.e., cause the PWM power supply to temporarily lose regulation and allow the supply voltage to spike. Unfortunately, if such a transient is large enough or long enough, it may cause a malfunction such as corruption of data stored in a memory.

To reduce the size of the drive transistors and filter inductors, and thus to allow an increase in the power supply's transient response, a typical PWM power supply includes multiple main phases that, in a steady state condition, operate in an alternating switching pattern such that at least one main phase is always on. This allows the different main phases to share the power supplying duties to the load. Although this sharing requires more circuitry, it allows faster drive transistors and smaller filter inductors to be used. But unfortunately, even a multiple-main-phase PWM power supply is often unable to prevent relatively fast transients from occurring on the regulated power supply voltage.

Another way to reduce the magnitude of occurrences of power-supply transients is to use a larger filter capacitor that has a relatively low equivalent series resistance (ESR) and an acceptable high-frequency response. However, such a filter capacitor take is often relatively large and expensive.

Alternatively, one can add a linear regulator to a PWM regulator to reduce the magnitude of occurrences of undesirable transients. The linear regulator, which is less efficient but has a faster response time than the PWM regulator, is activated only when a transient occurs to provide the fast correction response. This solution is described in detail in U.S. Pat. No. 5,926,384 to Jochum et al. But problems with this solution include the complexity and space requirements of adding a linear regulator, and also the inefficiency of dissipating power across the linear regulator's pass element.

SUMMARY OF THE INVENTION

In one aspect of the invention regulator comprises an output node operable to provide a regulated supply voltage, a first main-phase drive circuit operable to provide a first main load current to the output node and having an on time and an off time, and a first transient-phase drive circuit operable to provide a first transient load current to the output node and having an on time and an off time that are respectively less than the on and off times of the first main-phase drive circuit.

By providing such a regulator, transients on the regulated supply can be reduced or eliminated by engaging a faster drive phase that can supply the transient current until the slower main drive phase is able to modify its current to the load as appropriate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
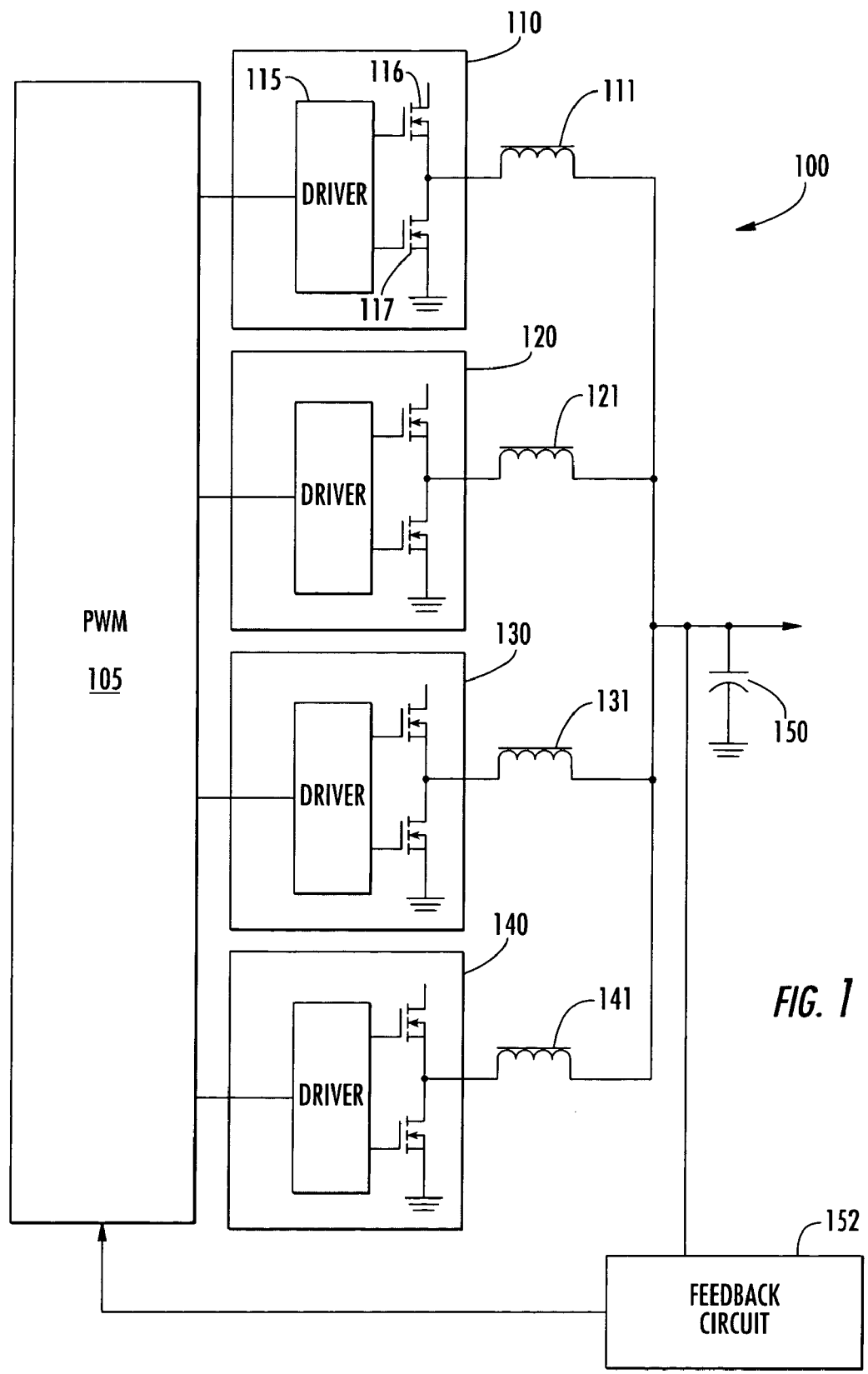
FIG. 1 is schematic diagram of a PWM power supply in accordance with an embodiment of the invention.

FIG. 1 shows a schematic diagram of a PWM power supply 100 in accordance with an embodiment of the invention. The PWM power supply 100 of FIG. 1 includes a pulse-width modulator 105, four drive circuits 110, 120, 130, and 140, along with corresponding filter inductors 111, 121, 131, and 141, a filter capacitor 150, and a feedback circuit 152. The drive circuits 110 and 120 represent two main phases and the drive circuits 130 and 140 represent two fast phases. The PWM power supply 100 is typically supplied by an unregulated AC power supply (not shown) and typically drives an electronic load (also, not shown) requiring a highly regulated voltage supply, such as, for example a central processing unit of a typical computer system. The PWM modulator 105 activates the drive circuits 110, 120, 130, and 140 based on the feedback from the feedback circuit 152.

The pulse-width modulator 105 is well known in the art and will not be described in great detail herein. For the purposes of this discussion, the pulse-width modulator 105 of FIG. 1 is operable to provide voltage pulses of varying width to each of the phase drive circuits 110, 120, 130, and 140 according to the current demanded by a load connected to the PWM power supply 100.

In the embodiment shown in FIG. 1, the PWM power supply 100 includes two main phase drive circuits (110 and 120 in FIG. 1) but may include more in order to provide the necessary current for larger loads. As stated above, the drive circuits 110 and 120 work together in tandem to provide a majority of the power requirements demanded by the load. Different from prior art, however, the PWM power supply 100 of FIG. 1 includes at least one fast phase drive circuit, here two fast drive circuits 130 and 140.

Each drive circuit 110, 120, 130, and 140, whether it represents a main phase or a fast phase, comprises a driver 115 and two NMOS drive transistors 116 and 117 coupled in a push/pull configuration. Only the components of the first main phase drive 110 are labeled in FIG. 1 for clarity of illustration.

Because the main drive circuits 110 and 120 provide the bulk of the power to the load (not shown), the output transistors 116 and 117 of these drive circuits are relatively large to provide relatively large currents to the load. But because they are relatively large, the on/off times of these output transistors 116 and 117 are relatively slow. Consequently, the PWM circuit 105 drives these transistors with relatively long pulse widths for maximum efficiency, and the filter inductors 111 and 120 are relatively large, for example on the order of 500 nanohenries (nH), to prevent such long pulse widths from oversupply the load. But the long on/off times and large inductors cause the drive circuits 110 and 120 to have relatively slow response times, often too slow to prevent or reduce transients in the regulated voltage Vreg.

The PWM supply 100 also includes two fast drive circuits 130 and 140 for preventing or reducing transients in Vreg. The transistors 116 and 117 of the circuits 130 and 140 are smaller, and thus have faster on/off times, than the transistors in the drive circuits 110 and 120. Consequently, the PWM circuit 105 can drive these transistors with relatively short pulse widths and still maintain maximum efficiency, and the filter inductors 131 and 141 are relatively small, for example on the order of 50 nH and 5 nH, respectively, to allow the circuits 130 and 140 to quickly respond to transients in Vreg. Once the transient has dissipated to a predetermined level, the PWM circuit 105 can deactivate the drive circuits 130 and 140 either together or separately.

Still referring to FIG. 1, one can use the relation V=Ldi/dt to determine the values of the inductors 130 and 140 based on the values of expected transients, where V is the voltage across the inductor, L is the inductance, and di/dt is the rate of change of current through the inductor. For example, assume that two types of transients are expected, a first transient caused by the load suddenly increasing its current draw by $1\times10^8$ A per second, and a second transient caused by the load suddenly increasing its current draw by $1\times10^9$ A per second. Also assume that ideally Vreg=1.2 V, the drains of the transistors 116 in the circuits 130 and 140 are coupled to a 6.2 V supply, and the gates of those transistors 116 are conventionally overdriven such that the full 6.2 V appears at their sources. Therefore, from the above relation, L=(6.2−1.2)/($1\times10^8$)=50 nH for the inductor 131 and L=(6.2−1.2)/($1\times10^9$)=5 nH.

Of course, the PWM power supply 100 can include more or fewer fast drive circuits such as the circuits 130 and 140, and these circuits can have inductors with different inductance values. For example, the supply 100 can have a number of drive circuits each having an inductor that is an order of magnitude smaller than the inductor of the preceding drive circuit.

Still referring to FIG. 1, the feedback circuit 152 provides a feedback signal that the PWM circuit 105 uses to determine what drive circuit or drive circuits to activate. For example, under normal operation where no transients appear on Vreg, the circuit 105 may alternately activate the main-phase drive circuits 110 and 120 and deactivate the fast-phase drive circuits 130 and 140. In response to a transient, however, the circuit 105 may activate one or both of the fast-phase drive circuits 130 and 140 in addition to the main-phase drive circuits 110 and 120 until the transient is reduced to a predetermined level. That is, the activated fast drive circuit(s) 130 and 140 provide(s) a "shot" of current to the load (not shown in FIG. 1) to reduce or eliminate the transient until the slower main drive circuits 110 and 120 are able to provide the new load current.

In one embodiment, the feedback circuit 152 operates as a multi-window comparator that causes the PWM circuit 105 to activate the fast drive circuits 130 and 140 based on the level of Vreg. For example, assume that ideally Vreg=1.2 V, the inductors 111 and 121 equal 500 nH, the inductor 131 equals 50 nH, and the inductor 141 equals 5 nH. The feedback circuit 152 can be designed such that the PWM circuit 105 activates the main drive circuits 110 and 120 if Vreg moves out of the range 1.19–1.21, activates the fast drive circuit 130 (in addition to the main drive circuits 110 and 120) if Vreg moves out of the range 1.15–1.25 V, and activates the fast drive circuit 140 (in addition to the drive circuits 110, 120, and 130) if Vreg moves out of the range 1.10–1.30 V. The PWM 105 may also deactivate the fast drive circuits 140 and 130 when Vreg returns to within the ranges 1.10–1.30 V and 1.15–1.25 V, respectively. Of course when Vreg moves out of the range 1.19–1.21, the PWM 105 alternately activates the main drive circuits 110 and 120.

Typically, Vreg does move out of this range regularly so that the drive circuits 110 and 120 are active for at least a portion of each cycle.

Still referring to FIG. 1, other embodiments of the PWM power supply 110 are contemplated. For example, the feedback circuit 152 may be incorporated within the PWM circuit 105. Further, the feedback circuit 152 may implement one or more asymmetrical windows about Vreg, or may implement another technique for providing transient information to the PWM circuit 105.

Figure 2:
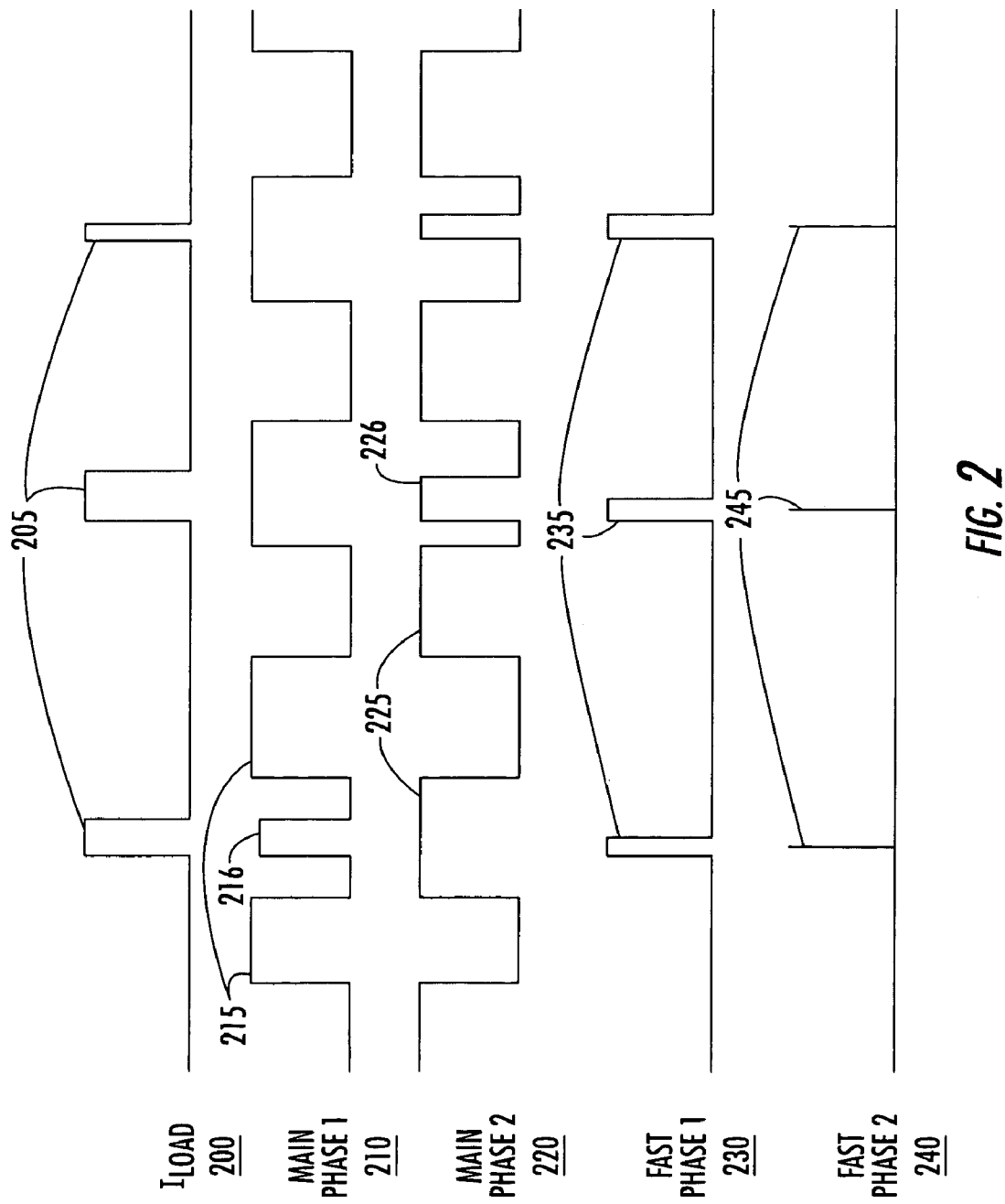
FIG. 2 is a timing diagram of voltage pulses for the phase drivers of the PWM power supply of FIG. 1 in accordance with an embodiment of the invention.

FIG. 2 is a timing diagram showing how the PWM supply 100 of FIG. 1 responds to transients in the regulated supply voltage Vreg according to an embodiment of the invention. The plot 200 shows the load current Iload drawn from the Vreg terminal of the supply 100. The sudden peaks 205, which occur when power requirements of the load are higher, can cause transients in Vreg, thus causing Vreg to temporarily change from its ideal level. The plots 210, 220, 230, and 240 respectively indicate when the drive circuits 110, 120, 130, and 140 are active (logic high) and inactive (logic low).

During times of non-peak Iload, the main drive circuits 110 and 120 are alternately active, and the fast drive circuits 130 and 140 are inactive. That is, the circuit 110 is on while the circuit 120 is off, and vice versa. Conversely, during times 205 of peak Iload, all of the drive circuits 110, 120, 130, and 140 that would otherwise be inactive are on for various periods of time 216, 226, 235, and 245, respectively. Generally, the fastest drive circuit, here the drive circuit 140, is on for the shortest time, and the slowest drive circuit, here the drive circuit 110, is on for the longest time. The reason for this is that the faster the drive circuit, the smaller the drive transistors 116 and 117 associated filter inductor (FIG. 1), and thus the more quickly the current provided by the drive circuit reaches a desired maximum value. Consequently, if the drive circuit is on for too long, the current through the drive transistors may grow large enough to damage the drive circuit.

Still referring to FIG. 2, as the number of fast drive circuits increases, the transient response time of the PWM supply 100 and the need for a large filter capacitor 150 (FIG. 1) decreases. Therefore, one can reduce the size of, and theoretically eliminate, the filter capacitor 150 by including an adequate number of fast drive circuits (with the appropriate values for the filter inductors) in the PWM power supply 100, and can attain a transient response time on the order of nanoseconds or less.

Figure 3:
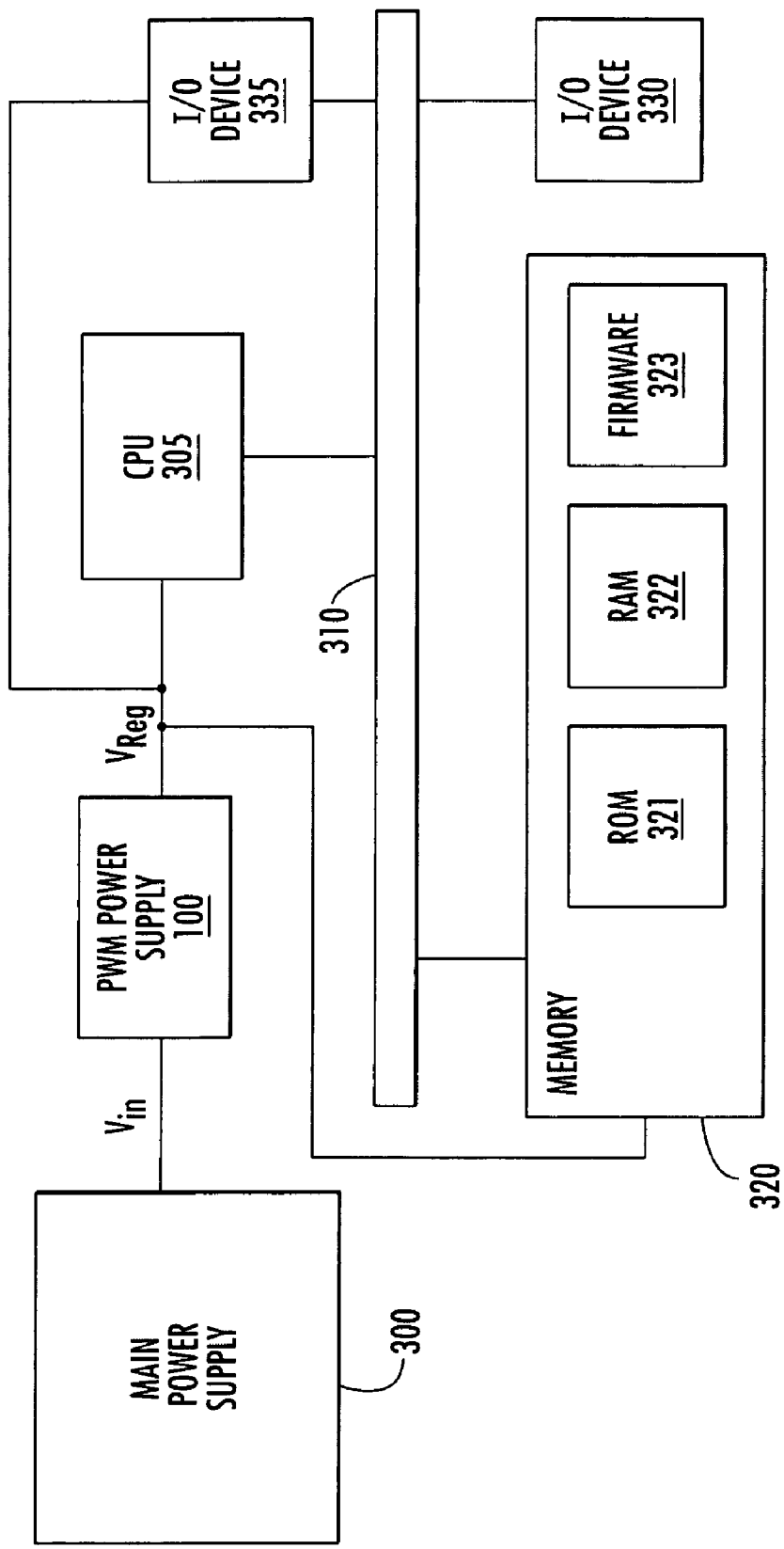
FIG. 3 is a block diagram of a typical electronic system that includes the PWM power supply of FIG. 1 in accordance with an embodiment of the invention.

FIG. 3 is a block diagram of an electronic system, here a computer system, that incorporates the PWM power supply 100 of FIG. 1 in accordance with an embodiment of the invention. The PWM power supply 100 receives DC voltage Vin from a main power supply 300. Vin may be a regulated or unregulated, but is higher than Vreg. The main supply 400 may generate Vin from an AC line voltage (e.g., 120 VAC) or from another AC or DC voltage. A processor such as a CPU 305 receives power from the PWM power supply 100. The CPU is communicatively coupled to a system bus 310. The system bus 310 is also communicatively coupled to a system memory 320 that may comprise ROM 321, RAM 322 and firmware 323. Additionally, the system bus 310 is communicatively coupled to one or more I/O devices 330 and 335. The PWM power supply 100 may also power the system memory 320 and one or more I/O devices 330 and 335.

What is claimed is:

1. A power supply, comprising:
   an output node operable to provide a regulated supply voltage;
   a main-phase drive circuit operable to provide a main load current to the output node and having an on time and an off time that are determined by a single feedback signal generated from the regulated supply voltage; and
   a transient-phase drive circuit operable to provide a transient load current to the output node and having an on time and an off time that are determined by the same feedback signal and that are respectively less than the on and off times of the main-phase drive circuit.

2. The power supply of claim 1, further comprising a filter capacitor coupled to the output node.

3. The power supply of claim 1, further comprising a circuit coupled to the main-phase and transient-phase drive circuits and operable to pulse-width modulate the main-phase and transient-phase drive circuits in response to the feedback signal.

4. The power supply of claim 1 further comprising a circuit that is operable to activate the main-phase drive circuit when the regulated voltage strays from a first range and is operable to activate the transient-phase drive circuit when the regulated voltage strays from a second range that is greater than and includes the first range.

5. The power supply of claim 1, further comprising a feedback circuit coupled to the output node and to the main-phase and transient-phase drive circuits and operable to generate the feedback signal from the regulated supply voltage.

6. The power supply of claim 1, further comprising:
   a main filter inductor coupled between the main-phase drive circuit and the output node; and
   a transient filter inductor coupled between the transient-phase drive circuit and the output node, the transient filter inductor having a smaller inductance than the main filter inductor.

7. A power supply, comprising:
   an output node operable to provide a regulated supply voltage;
   a main-phase drive circuit operable to provide a main load current to the output node, the main load current determined by a single feedback signal;
   a transient-phase drive circuit operable to provide a transient load current to the output node, the transient load current determined by the same feedback signal;
   a feedback circuit operable to generate the feedback signal from the regulated supply voltage;
   a main-phase filter inductor having an inductance and coupled between the main-phase drive circuit and the output node; and
   a transient-phase filter inductor coupled between the transient-phase drive circuit and the output node and having an inductance that is smaller than the inductance of the main-phase filter inductor.

8. The power supply of claim 7 wherein the inductance of the first main-phase filter inductor is approximately 500 nanohenries.

9. The power supply of claim 7 wherein the inductance of the fist transient-phase inductor is approximately 50 nanohenries.

10. The power supply of claim 7 wherein the inductance of the fist transient-phase inductor is approximately 5 nanohenries.

11. The power supply of claim 7 wherein:
the main-phase drive circuit has an on time and an off time; and
the transient-phase drive circuit has an on time and an off time that are respectively less than the on and off times of the main-phase drive circuit.

12. The power supply of claim 7, further comprising a circuit operable to pulse-width modulate the main-phase and transient-phase drive circuits.

13. An electronic system comprising:
a power supply comprising,
an output node operable to provide a regulated supply voltage,
a main-phase drive circuit operable to provide a main load current to the output node and having an on time and an off time that are determined by a single feedback signal generated from the regulated supply voltage,
a transient-phase drive circuit operable to provide a transient load current to the output node and having an on time and an off time that are determined by the same feedback signal and that are respectively less than the on and off times of the main-phase drive circuit; and
an electronic component having a voltage supply node coupled to the output node of the power supply.

14. A method for powering a load, the method comprising:
switching a first current to a load at a first rate and for a first time determined by a single feedback signal generated from a voltage across the load; and
switching a second current to the load at a second rate and for a second time determined by a change in the same feedback signal, the second rate being higher than the first rate, the second time being shorter than the first time.

15. The method of claim 14 wherein:
switching the first current comprises switching the first current to the load when a voltage across the load strays from a first predetermined range; and
switching the second current comprises switching the second current to the load when the voltage across the load strays from a second predetermined range that is larger than and includes the first predetermined range.

16. The method of claim 14 wherein the change in the feedback signal is caused by a change in the load.

17. The method of claim 14 wherein:
switching the first current comprises switching the first current through a first inductor; and
switching the second current comprises switching the second current through a second inductor that has a smaller inductance than the first inductor.

18. The method of claim 14, further comprising filtering the first current with a first inductor and filtering the second current with a second inductor, the first inductor having an inductance an order of magnitude greater than the inductance of the second inductor.

19. A method for powering a load, the method comprising:
switching a first current to a load at a first rate and for a first time;
switching a second current to the load at a second rate and for a second time in response to a change in the load, the second rate being higher than the first rate, the second time being shorter than the first time; and
switching a third current to the load at a third rate and for a third time in response to a change in the load, the third rate being higher than the second rate, and the third time being shorter than the second time.

20. A power supply, comprising:
an output node operable to provide a regulated supply voltage;
a main-phase drive circuit operable to provide a main load current to the output node and having an on time and an off time;
a first transient-phase drive circuit operable to provide a first transient load current to the output node and having an on time and an off time that are respectively less than the on and off times of the main-phase drive circuit; and
a second transient-phase drive circuit operable to provide a second transient load current to the output node and having an on time and an off time that are respectively less than the on and off times of the first transient-phase drive circuit.

21. A power supply, comprising:
an output node operable to provide a regulated supply voltage;
a first main-phase drive circuit operable to provide a first main load current to the output node and having an on time and an off time;
a first transient-phase drive circuit operable to provide a first transient load current to the output node and having an on time and an off time that are respectively less than the on and off times of the first main-phase drive circuit;
a second main-phase drive circuit operable to provide a second main load current to the output node and having an on time and an off time; and
a second transient-phase drive circuit operable to provide a second transient load current to the output node and having an on time and an off time that are respectively less than the on and off times of the first and second main-phase drive circuits and the first transient-phase drive circuit.

22. An electronic system, comprising:
a power supply, comprising,
an output node operable to provide a regulated supply voltage,
a main-phase drive circuit operable to provide a main load current to the output node and having an on time and an off time,
a first transient-phase drive circuit operable to provide a first transient load current to the output node and having an on time and an off time that are respectively less than the on and off times of the main-phase drive circuit, and
a second transient-phase drive circuit operable to provide a second transient load current to the output node and having an on time and an off time that are respectively less than the on and off times of the first transient-phase drive circuit; and
an electronic component having a voltage supply node coupled to the output node of the power supply.

23. A method for powering a load, the method comprising:
switching a first current to a load at a first rate and for a first time;
switching a second current to the load at a second rate and for a second time in response to a change in the load, the second rate being higher than the first rate, the second time being shorter than the first time; and
switching a third current to the load at a third rate and for a third time in response to a change in the load, the third rate being higher than the first rate and lower than the second rate, the third time being shorter than the first time and longer than the second time.

* * * * *